US006130397A

United States Patent [19]
Arai

[11] Patent Number: 6,130,397
[45] Date of Patent: Oct. 10, 2000

[54] THERMAL PLASMA ANNEALING SYSTEM, AND ANNEALING PROCESS

[75] Inventor: Michio Arai, Tokyo, Japan

[73] Assignee: TDK Corporation, Tokyo, Japan

[21] Appl. No.: 09/186,139

[22] Filed: Nov. 5, 1998

[30] Foreign Application Priority Data

Nov. 6, 1997 [JP] Japan .................................... 9-320477

[51] Int. Cl.[7] ........................................................ B23K 9/00
[52] U.S. Cl. ......................... 219/121.37; 117/87; 427/571
[58] Field of Search ........................ 219/121.37; 156/345; 118/725; 427/563, 446, 571; 204/164; 117/87

[56] References Cited

U.S. PATENT DOCUMENTS 4,853,250 8/1989 Boulos et al. .......................... 427/446
4,897,282 1/1990 Kniseley et al. ......................... 427/446
4,911,805 3/1990 Ando et al. ............................. 204/164
5,409,857 4/1995 Watanabe et al. .
5,508,066 4/1996 Akahori .................................. 427/571
5,609,921 3/1997 Gitzhofer et al. ....................... 427/446
5,964,942 10/1999 Tanabe et al. ........................... 117/87

*Primary Examiner*—Teresa Walberg
*Assistant Examiner*—Quang Van
*Attorney, Agent, or Firm*—Oblon, Spivak, McClelland, Maier & Neustadt, P.C.

[57] ABSTRACT

A thermal plasma annealing system comprises a radiation irradiation means for irradiating a thin film formed on a substrate with heat or radiation emitted from a thermal plasma. This annealing system enables a material relatively sensitive to high heat such as glass to be used as a substrate, and can lend itself to a large amount of annealing treatments on a mass-production scale, yielding consistent annealing quality.

14 Claims, 5 Drawing Sheets

THERMAL PLASMA ANNEALING SYSTEM, AND ANNEALING PROCESS

BACKGROUND OF THE INVENTION

The present invention relates generally to an annealing system for silicon thin films used with various semiconductor products such as ICs, TFTs, solar cells, and sensors, and more particularly to an annealing system and process that are capable of treating a silicon thin film formed on a glass substrate.

A conventional production process of semiconductor products makes use of an annealing step where impurities are doped on a given area on a substrate on which a silicon thin film such as polycrystalline silicon is laminated, and the impurities are then diffused or activated by heat treatment to form a source or drain, recover breaks in the crystals due to implantation of impurities, or crystallize an amorphous area, whereby various functions are made available.

When such annealing is carried out only by use of heat treatment with a heating device, no desired annealing effect is obtained at a heating temperature of lower than 1,000° C. When a substrate formed of a material having relatively low heat resistance, e.g., glass is exposed to a high temperature exceeding 1,000° C., the substrate is often disabled due to cracking or breaking. For an annealing step consisting only of heat treatment, therefore, it is required to use an expensive, difficult-to-handle, and heat-resistant material such as quartz for the substrate. This incurs a production cost rise, and places some limitation on the degree of freedom in processing equipment as well.

On the other hand, an annealing process making use of laser beam irradiation has been proposed or put to practical use as an alternative annealing means that does not rely upon a simple heat treatment. According to this process wherein a thin film on a substrate is directly irradiated with a laser beam, it is unnecessary to increase the temperature of the substrate to such a high temperature. However, when the laser beam irradiation process is used to increase the number of processing shots on a mass-production scale, it is required to increase the width of laser beams. As a result, there is a difference in the irradiation energy density between laser beams, which may otherwise make it difficult to achieve consistent annealing quality.

SUMMARY OF THE INVENTION

An object of the present invention is to provide a thermal plasma annealing system which enables a substrate relatively sensitive to high heat such as glass to be used as a substrate, and can lend itself to bulk annealing treatments, thereby ensuring consistent annealing quality.

The aforesaid object is achieved by the inventions defined below as (1) to (5).

(1) A thermal plasma annealing system comprising a radiation irradiation means for irradiating a thin film formed on a substrate with heat or radiation emitted from a thermal plasma.

(2) The thermal plasma annealing system of (1), wherein said thin film formed on said substrate is a semiconductor thin film composed mainly of silicon.

(3) The thermal plasma annealing system of (1) or (2), wherein said radiation comprises ultraviolet radiation.

(4) The thermal plasma annealing system of any one of (1) to (3), which further comprises a control means located between a plasma torch and said substrate for shielding heat or radiation coming out of said plasma torch, so that a part of said heat or radiation is directed onto said substrate.

(5) The thermal plasma annealing system of any one of (1) to (4), wherein a gas for forming said plasma comprises argon and up to 10% of at least one of nitrogen, hydrogen, and helium.

DETAILED EXPLANATION OF THE PREFERRED EMBODIMENTS

The thermal plasma annealing system of the present invention comprises a radiation irradiation means for irradiating a thin film formed on a substrate with heat or radiation emitted from a thermal plasma. By irradiating the thin film on the substrate with the heat or radiation emitted out of the thermal plasma, it is thus possible to carry out annealing treatment at a temperature relatively lower than that used for simple heat treatment and, hence, use as a substrate a material having relatively low heat resistance, e.g., glass.

By the term "thermal plasma" used herein is generally intended a plasma that is generated at atmospheric pressure or at a degree of vacuum approximate to atmospheric pressure. In the thermal plasma, ions, electrons, and neutrons are at substantially equal temperatures of usually about $5\times10^3$ to $2\times10^{4}$° K, and have large heat capacities. The thermal plasma is broken down into two types, a direct-current plasma and a high-frequency plasma, depending on what mode it is generated in, with the high-frequency plasma being preferred. The high-frequency plasma comprises an inductively coupled plasma and a waveguide-coupled plasma, among which the inductively coupled plasma is preferred.

The inductively coupled plasma is generated and maintained by induction heating of a plasma gas with electromagnetic field energy given by a high-frequency coil, etc. The energies generated from a plasma comprise heat energy, and radiation generated by excitation of plasma gas particles as well. Such radiation includes infrared radiation, visible light radiation, ultraviolet (UV) radiation, etc., among which the ultraviolet radiation is preferred because of its good annealing action.

Figure 11:
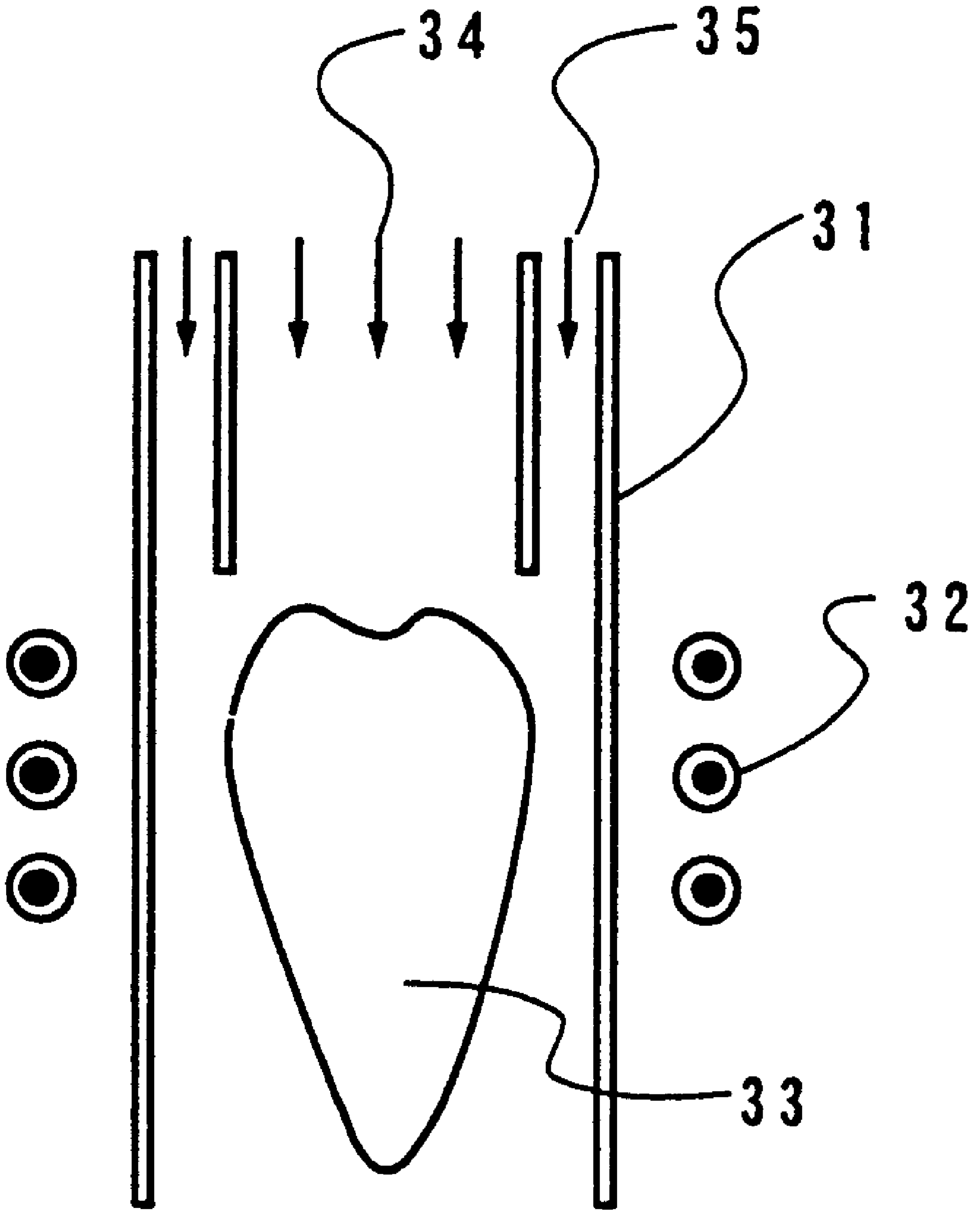
FIG. 11 is a sectional schematic of a plasma torch.

Here a portion that generates the induced thermal plasma is called a torch. FIG. 11 is a principle schematic of such an induced thermal plasma torch structure. Usually, the induced thermal plasma torch is built up of a sheathing tube 31 made of a material having high heat resistance such as quartz, which tube is open at one end. The sheathing tube is provided at the other end with a nozzle (not shown), through which a plasma gas 34 and a sheathing gas 35 are injected. An induced plasma 33 is generated by a high-frequency induction coil 32 located on the outside of the sheathing tube 31, and then discharged from the open end.

In this embodiment, the sheathing gas 35 is supplied along the innermost periphery of the sheathing tube 31 while the plasma gas is fed through a middle portion of the sheathing tube 31. The sheathing gas 35 is a gas for protecting the sheathing tube from the plasma, and the plasma gas 34 is a main gas for adding and maintaining the plasma. Actually, both the gases may be mixed together to form a plasma. Preferably, these gases should flow with symmetry. A lack of symmetry makes a breakdown of the sheathing tube 31 likely to occur due to decentration of a plasma frame. Symmetry may be obtained by imparting a direction-of-rotation component to the axis of symmetry.

Preferably but not exclusively, the plasma gas is hydrogen, nitrogen, oxygen, argon, and helium. These gases may be used alone or in combination of two or more at any desired mixing ratio. When the sheathing gas is used, it may be selected from the plasma gases mentioned just above.

The temperature of the induced thermal plasma is usually at least 5,000° K, and preferably 8,000 to 10,000° K although it varies with a distance from the nozzle. For instance, the degree of ionization of Ar is of the order of $10^{-3}$ to $10^{-2}$ in this temperature range. The operating pressure is preferably 100 to 760 Torr, and especially 200 to 400 Torr.

Generally but not exclusively, a high frequency of 0.01 to 20 MHz, and preferably 0.1 to 10 MHz is applied to a high-frequency induction coil at an applied high-frequency power of about 1 to 100 kW, and preferably about 10 to 50 kW. In the practice of the invention, however, it is acceptable to use such frequency and power as to generate and maintain a given plasma. Either a self-excited or a separately excited power source may be used to generate such frequency. However, preference is given to the self-excited power source because it is simple in structure, easy to handle, and inexpensive. For the oscillation circuit use may be made of an anode tuned oscillator, a Hartley oscillator, a Colpitts oscillator, etc. For a small-size system it is preferable to use an anode tuned or Hartley oscillator having a relatively simple circuitry, and for a large-size system it is preferable to use a Colpitts oscillator with a high voltage output. It is also preferable to use a vacuum-tube type self-excited oscillator because the frequency can change instantaneously upon a load change and follow it. The vacuum-tube type oscillator can be used for nearly all frequencies and outputs covered by the thermal plasma. An oscillator harnessing a semiconductor, too, may be used. However, the vacuum-tube type oscillator is more resistant to over-currents and over-voltages than the semiconductor oscillator, and so lends itself to a plasma subject to a violent load change like the thermal plasma.

The thin film formed on the substrate is irradiated with the heat or radiation emitted out of such a thermal plasma. Preferably to this end, the torch is provided on its lower side (that faces away from a gas supply nozzle) with a control means such as a control plate, and a collimator. Then, the control means is provided with an opening in the region where plasma irradiation is needed, i.e., in the region in alignment with the thin film on the substrate, so that the thin film can be irradiated with heat or radiation. It is also preferable to provide the opening with a shutter or other suitable means so as to irradiate the thin film with the heat or radiation only if need arises.

The amount of heat or radiation incident on the thin film on the substrate, and the temperature of the substrate heated thereby may be properly determined depending on the distance from a plasma flame to the opening, the distance from the opening to the substrate, the speed of movement of the substrate relative to the opening, and other considerations. The size of such an opening may be appropriately determined while the size of the substrate, the size of the thin film laminated thereon, and other factors are taken into account. For instance, when the opening is in a slit form, it is preferable that the slit has a width of 0.1 to 5 mm, and especially 1 to 2 mm, and a length commensurate with the size of the substrate, etc.

Preferably, the irradiation time is of the order of usually 10 seconds to 100 seconds, and especially 30 seconds to 70 seconds, although it may be properly adjusted depending on the heating temperature, etc. It is not required to cool or heat the substrate forcibly.

The substrate may be made of glass, ceramics, quartz, silicon, etc. When the annealing system of the present invention is utilized, however, it is especially preferable to use glass for the substrate.

The material that forms the thin film to be formed on the substrate may include a semiconductor element or structure to which energy should be fed by heating or radiation for the purpose of activating, recrystallizing or otherwise processing it upon doping of impurities. For instance, various semiconductors such as ZnSe, GaP, GaAs, GaS, InP, InGaAs, Si, SiC, Ge, and PbS are mentioned, with a semiconductor using polycrystalline or amorphous silicon being preferred.

For instance, such a semiconductor using polycrystalline or amorphous silicon is annealed after doping (implantation) of impurities in the fabrication process of TFTs (thin-film transistors) or for the purpose of recrystallization. By using the system of the present invention at such an annealing step, it is thus possible to use a substrate material having relatively low heat resistance, e.g., a glass substrate. This in turn enables the degree of freedom in semiconductor products to become so high that they can be fabricated at lower costs and on a mass-production scale.

Figure 1:
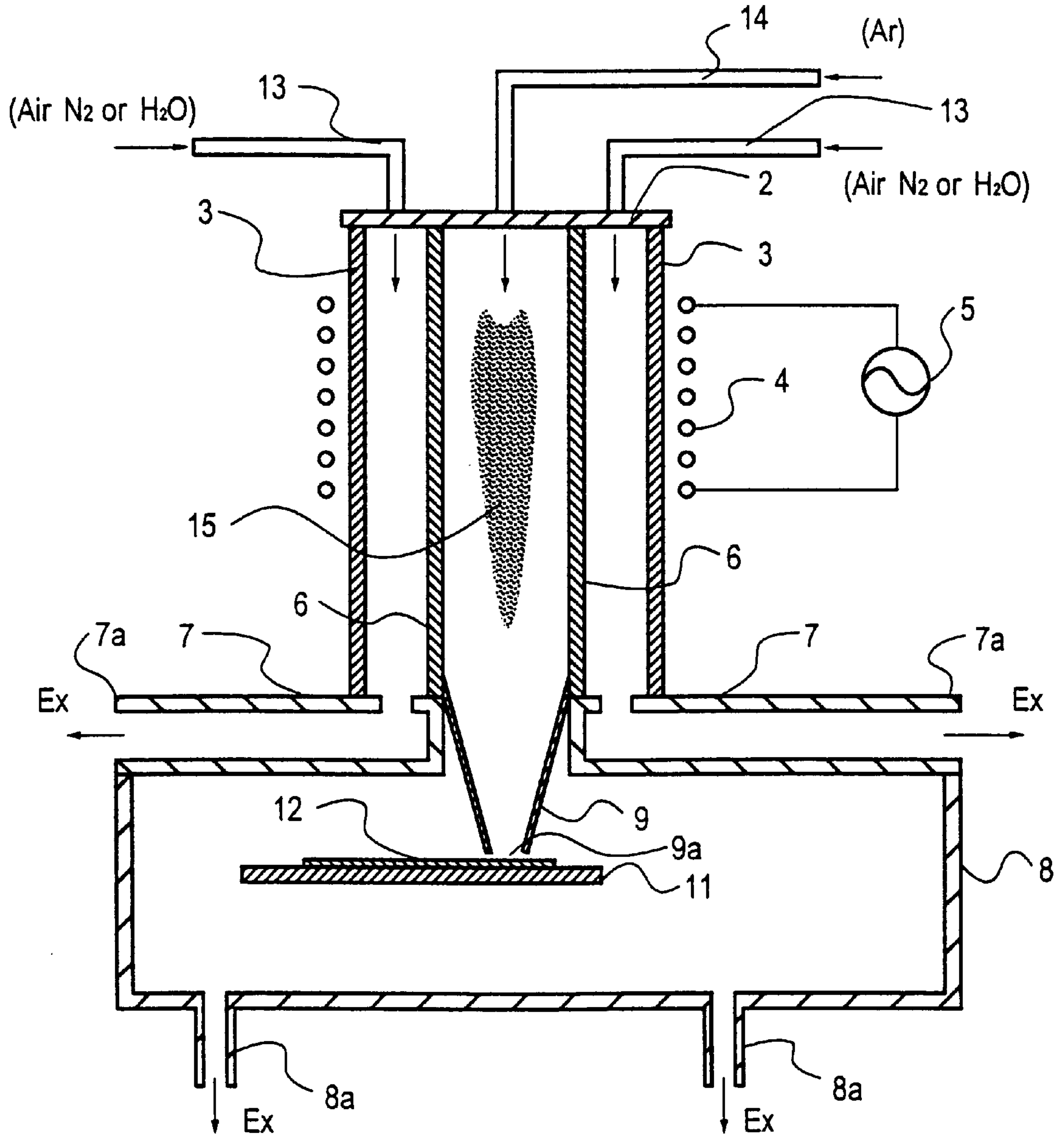
FIG. 1 is a sectional schematic of one embodiment of the plasma annealing system of the present invention.

One embodiment of the annealing system according to the present invention is now explained with reference to the accompanying drawings. FIG. 1 is a sectional schematic of the embodiment of the annealing system according to the present invention.

As can be seen from FIG. 1, the annealing system of the present invention comprises a flange 2, an inner 6, an outer 3, a cooling chamber 7, a control plate 9, a treating chamber 8, a high-frequency coil 4, and a high-frequency power source 5 connected to the high-frequency coil 4. In the treating chamber 8, a substrate 11 and a thin film 12 formed on the substrate 11 are supported by a movable support member (not shown) so that it is movable in the longitudinal direction of the substrate (or in the direction parallel with the drawing sheet). An atmosphere in the treating chamber 8 is exhausted (Ex) through exhaust ports 8*a*. To between the inner 6 and the outer 3 defining together a torch portion, a cooling gas such as air or nitrogen or cooling water is supplied from a coolant supply tube 13 via the flange 2. The cooling water is especially preferred because of its great effect on cutting off UV. The thus fed cooling gas or water passes between the inner 6 and the outer 3, and is then discharged (Ex) from discharge ports 7*a* in the cooling chamber 7.

A plasma gas such as argon is fed from a plasma supply tube 14 via the flange 2 into the inner 6, wherein the plasma gas is inductively heated by a high-frequency electromagnetic field generated by the high-frequency coil 4 to create a plasma (plasma frame) 15. It is here noted that a plasma ignition electrode, etc. may be provided separately. Heat and radiation such as UV generated from the plasma 15 are shielded by the control plate 9. Then, a portion of the heat or radiation is directed through an opening 9*a* in the control plate 9 onto the thin film 12 formed on the substrate 11, thereby annealing the thin film 12. Depending on annealing conditions such as heating time and temperature, the substrate 11 is moved forward so that the whole of the thin film can be uniformly irradiated with a given amount of energy obtained from the heat or radiation fed through the opening 9*a*.

By using heat in combination with UV or other radiation given out of the plasma, it is thus possible to carry out effective annealing at low temperatures.

EXAMPLE

The present invention is explained more specifically with reference to examples.

Figure 2:
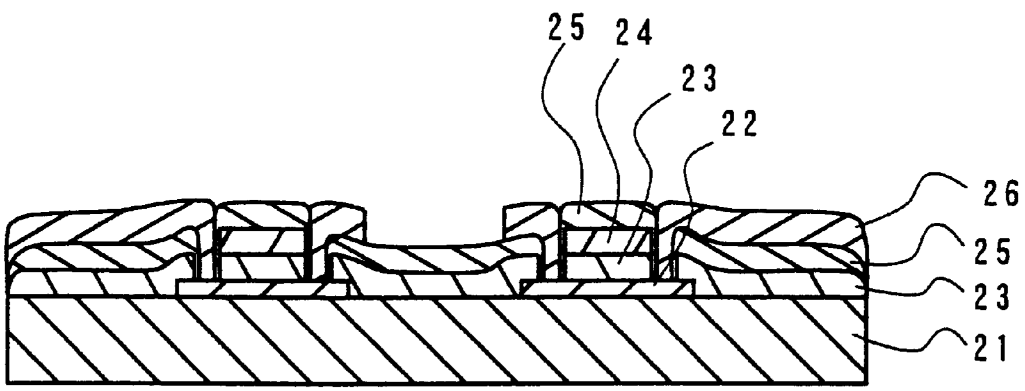
FIG. 2 is a schematic showing a part of a TFT annealed by the plasma annealing system of the present invention.
Figure 3:
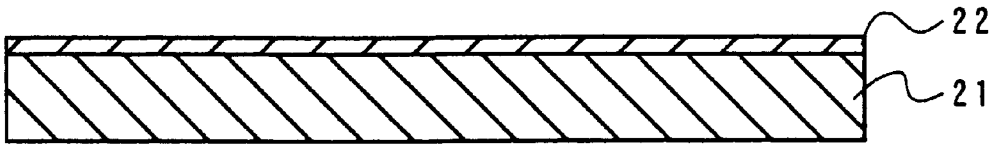
FIG. 3 is a schematic showing a part of one embodiment of a TFT fabrication process, with an amorphous silicon layer being formed on a substrate.

A TFT (thin-film transistor) element having such architecture as shown in FIG. 2 was prepared. In this case, the inventive annealing system as designed in FIG. 1 was used to anneal the element. First, an amorphous silicon (α-Si) layer 22 was formed on a 1737 glass substrate made by Corning at a thickness of 60 nm using a low-pressure CVD process wherein, as illustrated in FIG. 3, $Si_2H_6$ was introduced at a flow rate of 100 SCCM with a film-forming temperature of 460° C. and a film-forming pressure of 50 Pa.

The obtained amorphous silicon thin film was annealed to form polycrystalline silicon. Referring to the annealing conditions applied, a power of 5 kW was fed to the system at a frequency of 4 MHz, $Ar+H_2$ ($H_2$: 1%) was used as the plasma gas, and the pressure was set at 300 Torr. The opening 9*a* in the control plate had a width of 1 to 3 mm and a length nearly equal to that of the substrate 11. The speed of movement of the substrate was set at 4 mm/min.

Figure 4:
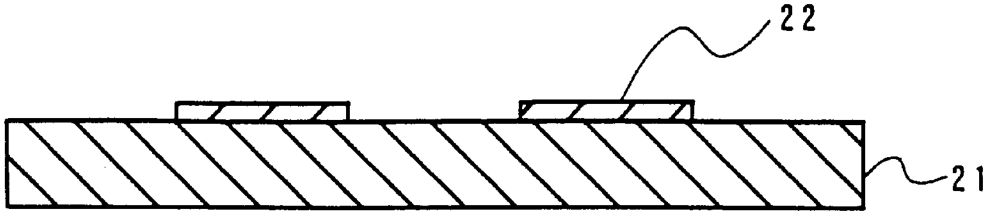
FIG. 4 is a schematic showing a part of the embodiment of the TFT fabrication process, with the amorphous silicon layer formed on the substrate being patterned.
Figure 5:
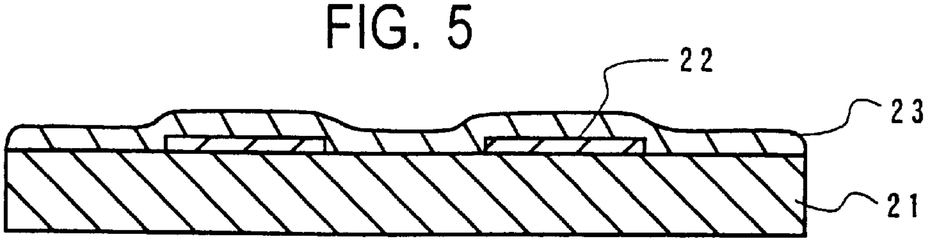
FIG. 5 is a schematic showing a part of the embodiment of the TFT fabrication process, with a gate insulating layer being formed on the amorphous silicon layer formed and patterned on the substrate.
Figure 6:
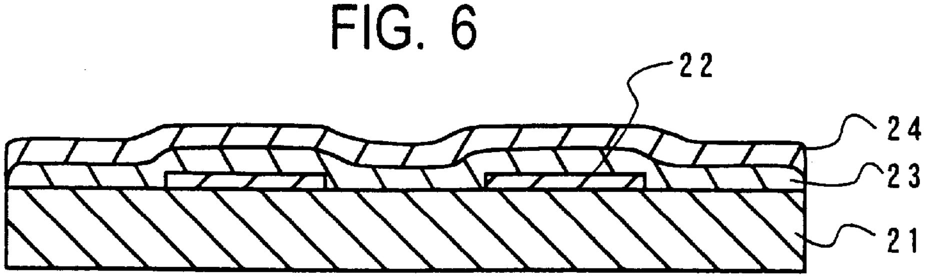
FIG. 6 is a schematic showing a part of the TFT fabrication process, with a gate electrode layer being further formed on the gate insulating film.

The obtained active silicon layer 22 was patterned into a given pattern in such a known manner as shown in FIG. 4. Then, as illustrated in FIG. 5, a gate insulating film 23 made of $SiO_2$ was formed on the patterned active silicon layer 22 at a thickness of 50 nm. Referring to the film-forming conditions applied, a plasma CVD process was carried out at a film-forming temperature of 400° C. and a film-forming pressure of 20 Pa while tetraethoxysilane (TEOS) was introduced at a flow rate of 50 SCCM. Subsequently, an aluminum gate electrode layer 24 was formed on the gate insulating layer at a thickness of 200 nm using a DC sputtering process where Al+Si (Si: 5 at %) was used as the target, as shown in FIG. 6. Referring to the film-forming conditions applied in this case, argon was used as the sputtering gas, and the film was formed at room temperature and a pressure of 1 Pa with a power input of 500 W.

Figure 7:
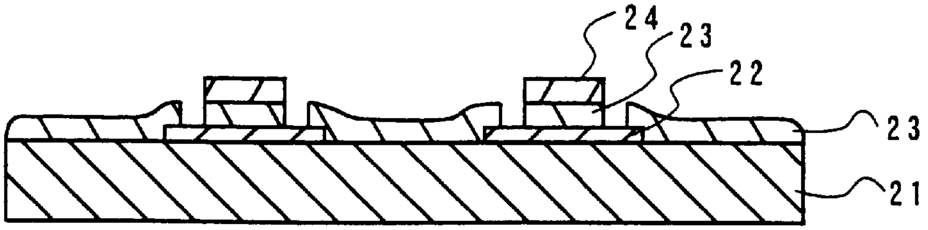
FIG. 7 is a schematic showing a part of the TFT fabrication process, with the gate insulating film and gate electrode layer being patterned.

Then, as shown in FIG. 7, the thus formed gate insulating film 23 and gate electrode layer 24 were patterned into a given pattern in a known manner, after which P and B were implanted therein in a known ion implantation manner to prepare samples.

Further, a thin film structure was annealed and thereby activated as mentioned above. Referring to the annealing conditions applied in this case, a power of 5 kW was fed to the system at a frequency of 4 MHz, $Ar+H_2$ ($H_2$: 1%) was used as the plasma gas, and the pressure was set at 300 Torr. The opening 9*a* in the control plate had a width of 1 to 3 mm and a length nearly equal to that of the substrate 21. The speed of movement of the substrate was set at 4 mm/min.

Figure 8:
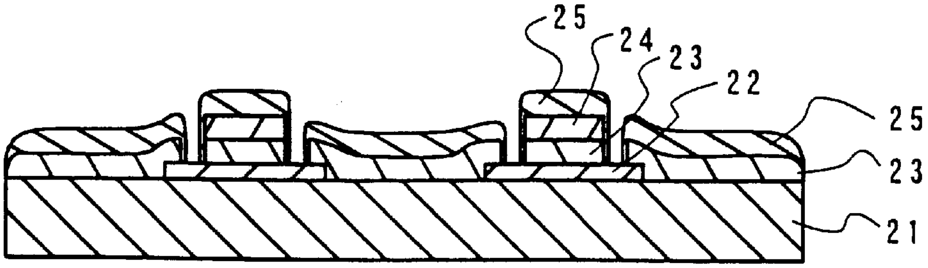
FIG. 8 is a schematic showing a part of the TFT fabrication process, with an interlaminar insulating film being further formed on the patterned gate insulating film and gate electrode layer.

Then, as shown in FIG. 8, an interlaminar insulating layer (PSG) 25 was formed using a mask. Further, an interconnecting Al metal layer was formed to obtain a thin-film transistor (TFT) as shown in FIG. 1.

Figure 9:
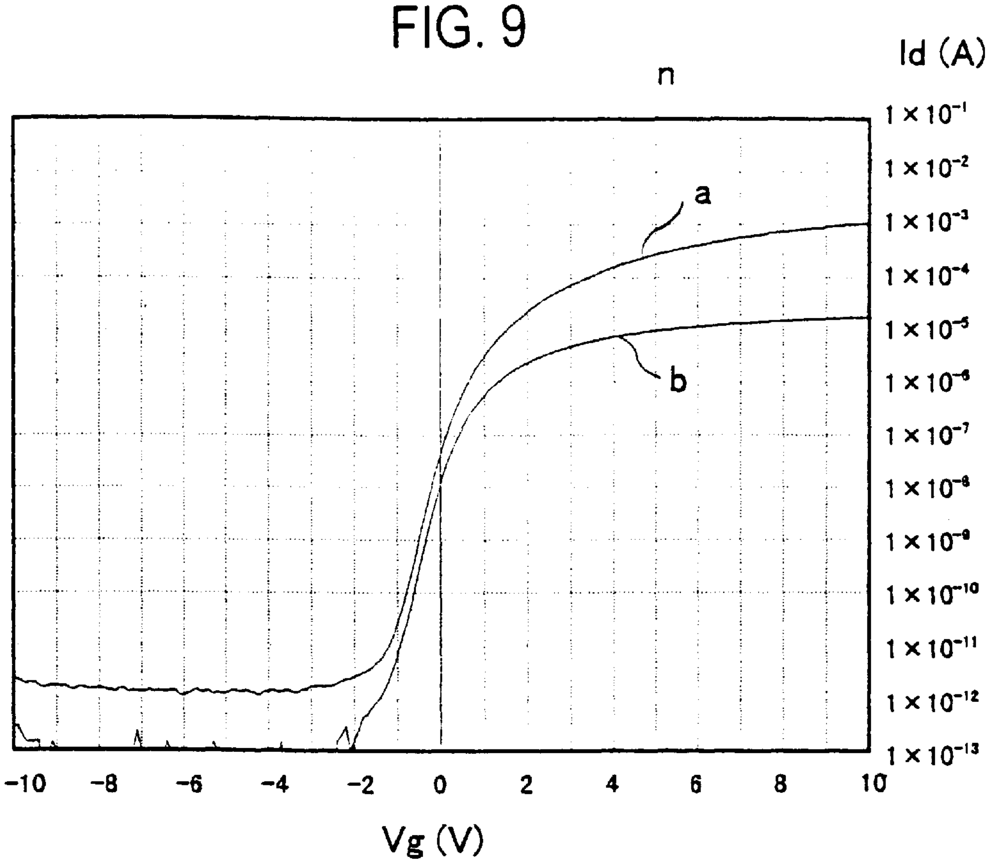
FIG. 9 is a graph showing the Vg-Id characteristics of an n-type TFT obtained by the annealing system of the present invention, with a curve a showing the results of measurement at VDS=10 V and a curve b showing the results of measurement at VDS=0.1 V.
Figure 10:
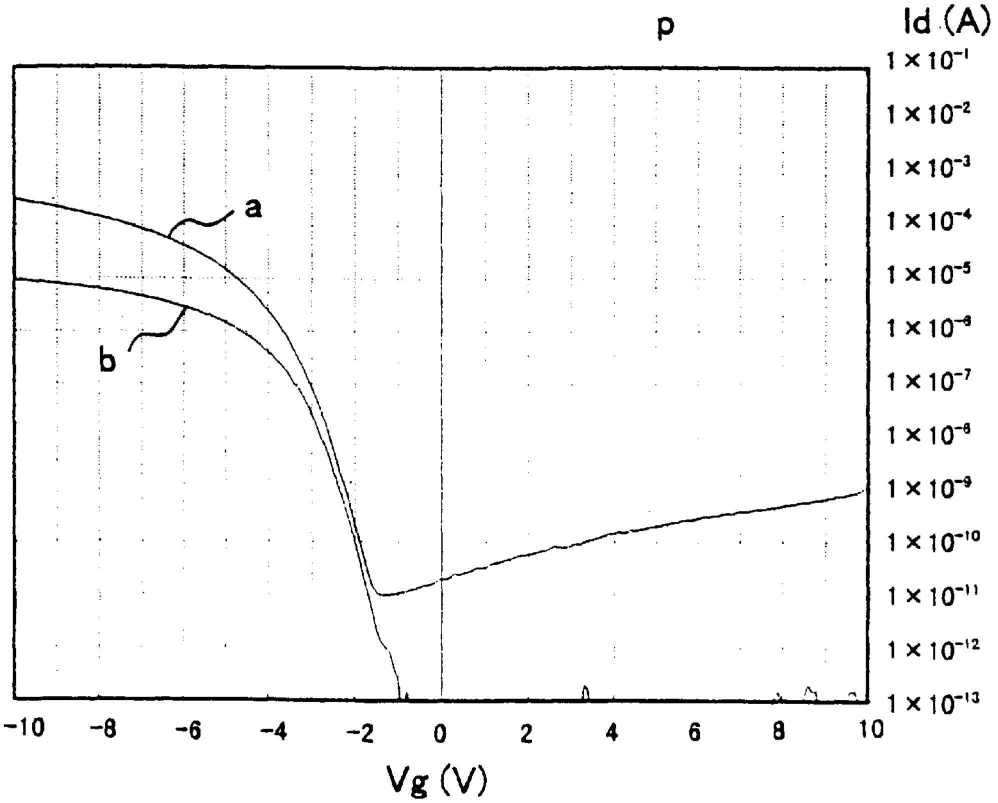
FIG. 10 is a graph showing the Vg-Id characteristics of a p-type TFT obtained by the annealing system of the present invention, with a curve a showing the results of measurement at VDS=10 V and a curve b showing the results of measurement at VDS=0.1 V.

The Vg-Id characteristics were measured of the obtained TFTs. The results of the n-type sample were plotted in FIG. 9, and those of the p-type sample were plotted in FIG. 10. In FIGS. 9 and 10, curves a show the results of measurement at VDS=10 V and curves b show the results of measurement at VDS=0.1 V. The electron mobility was also measured of each sample. It was found that N=129 $cm^2$/V·S for the n-type and N=82 $cm^2$/V·S for the p-type sample.

According to the present invention, it is thus possible to achieve a thermal plasma annealing system which enables a material relatively sensitive to high heat such as glass to be used as a substrate, and can lend itself to bulk annealing treatments on a mass-production scale, yielding consistent annealing quality.

Japanese Patent Application No. 320477/1987 is herein incorporated by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. A thermal plasma annealing system comprising:

a thermal plasma torch configured to generate a thermal plasma which heats or emits radiation; and a substrate configured to support a film, wherein said film is annealed by the thermal plasma heat or emitted radiation, and the thermal plasma torch comprises a shielding device that defines an opening whereby only a portion of the film is exposed to the heat or radiation emitted by the thermal plasma.

2. The annealing system of claim 1, wherein the substrate comprises a material from the group consisting of glass, ceramics, quartz and silicon.

3. The annealing system of claim 1, wherein the substrate comprises glass.

4. The annealing system of claim 1, further comprising a movable support member configured to move the substrate.

5. The annealing system of claim 1, wherein the thermal plasma torch comprises a shutter configured to open and close said opening.

6. The annealing system of claim 1, wherein the shielding device defines a slit-form opening.

7. The annealing system of claim 1, wherein the shielding device defines a slit-form opening having a width between 0.1 and 5 mm.

8. The annealing system of claim 1, wherein the film comprises a semiconducting material.

9. The annealing system of claim 1, wherein the film comprises a material of the group consisting of polycrystalline silicon and amorphous silicon.

10. The annealing system of claim 1, wherein the thermal plasma torch is configured to generate a thermal plasma which emits ultraviolet light.

11. The annealing system of claim 1, wherein the thermal plasma torch is configured to generate plasma between 8,000 and 10,000° K.

12. The annealing system of claim 1, wherein the thermal plasma torch is configured to operate at a pressure between 100 and 760 Torr.

13. The annealing system of claim 1, wherein the thermal plasma torch comprises:

a sheathing tube open at a first end;

a nozzle located at a second end of said sheathing tube; and a high-frequency induction coil located outside said sheathing tube.

14. The annealing system of claim 13, wherein the high-frequency induction coil is configured to operate between 0.01 and 20 MHZ.

* * * * *